(12) United States Patent
Early

(10) Patent No.: US 6,317,346 B1
(45) Date of Patent: Nov. 13, 2001

(54) REDUNDANT MULTIPHASE POWER SUPPLIES FOR COMMON LOAD DEVICE

(75) Inventor: Jack J. Early, Perth Amboy, NJ (US)

(73) Assignee: AT&T Corporation, Middletown, NJ (US)

( * ) Notice: Subject to any disclaimer, the term of this patent is extended or adjusted under 35 U.S.C. 154(b) by 0 days.

(21) Appl. No.: 09/709,140

(22) Filed: Nov. 9, 2000

(51) Int. Cl.[7] .................................................. H02M 7/23
(52) U.S. Cl. ................................................. 363/65; 363/70
(58) Field of Search ................................. 363/65, 67, 69, 363/70; 307/82

(56) References Cited

U.S. PATENT DOCUMENTS

| | | | |
|---|---|---|---|
| 5,319,536 | * 6/1994 | Malik | 363/65 |
| 5,796,601 | * 8/1998 | Yamamoto | 363/84 |
| 6,081,437 | * 6/2000 | Chen et al. | 363/70 |

* cited by examiner

Primary Examiner—Adolf Doneke Berhane
(74) Attorney, Agent, or Firm—McIntyre Harbin & Ki

(57) ABSTRACT

An apparatus and a method for using at least two multiphase AC power sources to provide seamless uninterruptible power to a common load by isolating a faulty phase or source upon detection of a fault in one of the sources or in one of the phases thereof. To combine at least two three-phase power sources in parallel, for example, the apparatus includes a power paralleling circuit comprising two three-phase silicon controlled rectifier (SCR) bridges and a controller. Each bridge receives power from one of two separate and/or independent three-phase power sources. The controller monitors the status or condition of respective phases of power and selectively gates an associated SCR in each bridge so as to simultaneously power the common load from the two sources. Isolation switches are located in series with each phase circuit of each power supply. In the event of a fault, e.g., a loss of phase synchronization between corresponding phases of the respective power sources, an over-voltage condition of a phase, an under-voltage condition of a phase, etc., the controller issues gating signals to the appropriate SCR(s) or isolation switch(es) to isolate the defective phase(s) or power source from the load. In an alternative embodiment, an alarm is issued to alert maintenance personnel of a fault condition. A corresponding method for achieving the aforestated fault tolerance is also disclosed.

23 Claims, 4 Drawing Sheets

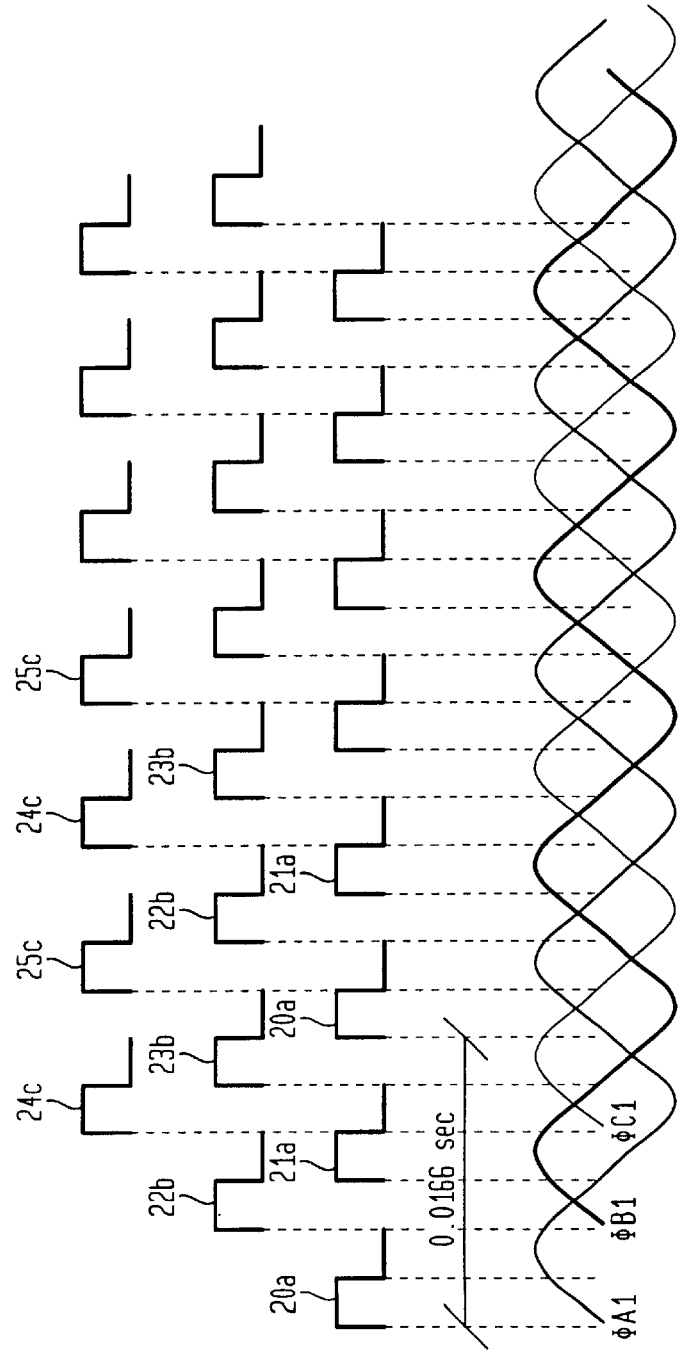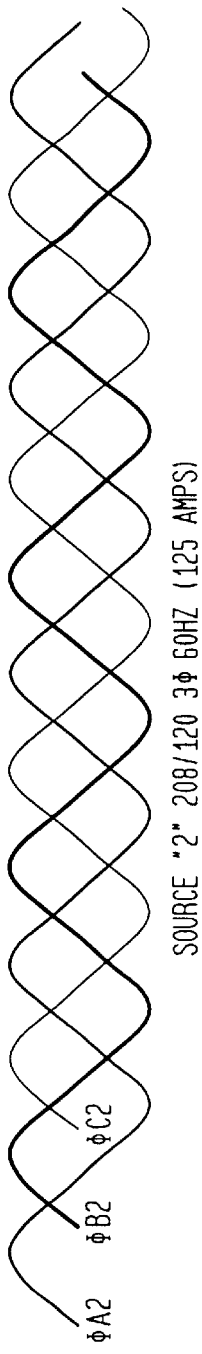

REDUNDANT MULTIPHASE POWER SUPPLIES FOR COMMON LOAD DEVICE

FIELD OF THE INVENTION

The present invention relates to a method and apparatus for improving reliability in a multiphase power supply arrangement. More specifically, the invention relates to SCR-controlled, multi-phase power sources that supply a common load in a manner that reduces or eliminates a "single point of failure."

BACKGROUND OF THE INVENTION

Faults in an AC power supply may exist as a phase loss, an under-voltage condition, an over-voltage condition, or other condition. Such faults may result from a variety of reasons including breaker trips, fuse loss, inverter faults, shorted turns in a transformer, and ground faults. Frequency or phase errors may also occur when the AC power frequency falls outside of specified ranges. Power supply faults have deleterious impact on electrical equipment, and in many applications cannot be tolerated.

Achieving reliability by using multiple power sources to supply a single-phase or DC load device is relatively simple. Multiple sources, for example, can be connected in parallel with the load device so that a failure of one source will not shut down the load. For single-phase AC supplies, this works fine, provided the phases of the respective sources are maintained in substantial synchronism. Other precautions, however, must be taken if the difference between the respective phases become significant. Connecting a single-phase AC load device to multiple single-phase AC sources does not require precise phase alignment because most load devices can tolerate minor phase differences. Using two or more multiphase AC sources to power a multiphase load, however, presents certain challenges. While it is possible to connect multiphase sources in parallel, a failure of any phase usually results in a failure in another phase or in the other source. Furthermore, prior systems cannot handle multiphase AC power sources in parallel to supply high performance loads where high reliability is essential.

SUMMARY OF THE INVENTION

To address the above and other problems, an embodiment of the present invention comprises respective silicon controlled rectifiers (SCRs) connected in parallel to respective phases of at least two multiphase AC power sources for supplying power to a common load. A first group of SCRs connects a first power source to the load and a second group of SCRs connects a second power source to the load. During normal operation, the SCRs are switched at or near zero crossings of the respective phases in a bridge rectifier fashion to allow source current from each AC power source to supply the load. Upon detection of a fault, a controller issues gating signals to selected SCR(s) to effectively remove the "defective" phase from the load, thereby permitting the corresponding phase of the other source to seamlessly continue powering the common load without interruption. The controller may optionally issue an alarm upon detection of a fault.

According to another embodiment of the invention, the topology of a paralleling SCR circuit comprises an input for a first multi-phase power source, a first 3-pole in-line input disconnect device, a first SCR group and a second in-line output disconnect device. A first multiphase power source connects to a first 3-pole in-line disconnect device which, in turn, connects a first group of silicon controlled rectifiers to second group of in-line output disconnect devices. The paralleling circuit also includes an input for second multiphase power source, a similarly connected third disconnect devices, and a similarly connected fourth disconnect devices. This scenario may be repeated for additional multiphase power sources. The topological structure of the paralleling circuit still further includes a paralleling output that combines the outputs of the first an second plurality of silicon controlled rectifiers so that they may power a common source.

Another embodiment of the invention includes a method of supplying continuous uninterruptible power to a common load using a power paralleling circuit that effectively combines separate and independent power sources. SCRs of first and second groups are connected to at least first power and second power sources, respectively. The method comprises providing respective gating signals to the first group of SCRs at or near zero crossing points of each phase of the multi-phase power source, and providing respective gating signals to the second group of SCRs at or near zero crossing points of the multi-phase power source, thereby alternately firing the respective SCRs at appropriate times during their AC cycles. The method additionally includes monitoring fault conditions in the respective phases of the power sources and controlling the SCR gating signals to isolate a phase or source from the load upon detection of a fault, thereby seamlessly supplying the load with uninterrupted power. The method optionally includes issuing an alarm upon detection of a fault.

Other objects, features, and advantages of the present invention will become apparent when considered in conjunction with the accompanying drawings. The invention, though, is pointed out with particularity by the appended claims.

BRIEF DESCRIPTION OF THE DRAWINGS

FIGS. 4A and 4B illustrate the multiphase voltage waveforms and corresponding timing signals for firing SCRs in accordance with a preferred embodiment of the present invention.

DESCRIPTION OF ILLUSTRATIVE EMBODIMENTS

Figure 1:
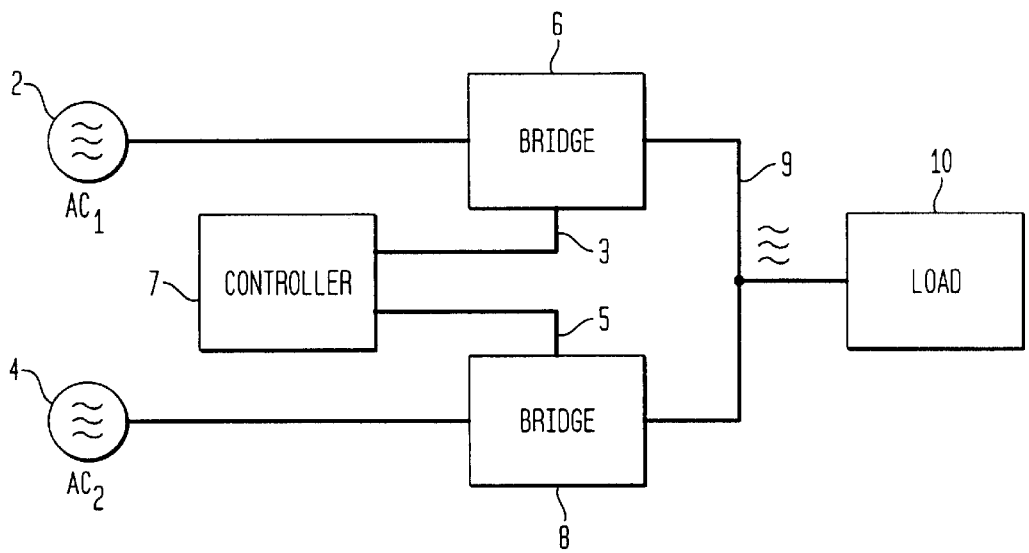
FIG. 1 illustrates a power paralleling circuit in accordance with one embodiment of the present invention.

FIG. 1 shows a power paralleling circuit for supplying power to a load 10 in accordance with one embodiment of the invention. A first three-phase power source 2 connects to a first power bridge 6. A second three-phase power source 4 connects to a second power bridge 8. In the United States, each power source 2 and 4 typically supplies three-phase alternating current ("AC") power at 208/120 volts and 60 hertz, although other electrical services are available. Power specifications, however, may vary in other countries according to standards adopted.

To power a common load, the respective phases of each power supply should be synchronized. Both power bridges 6 and 8 are under the control of a controller 7, which sends gating signals to SCRs contained in the bridges 6 and 8 via signal lines 3 and 5, respectively. The output of power bridge 6 connects in parallel to the output of power bridge 8 via an output line 9. The voltage on output fine 9 is a three-phase combined source that supplies a common load 10.

Figure 2:
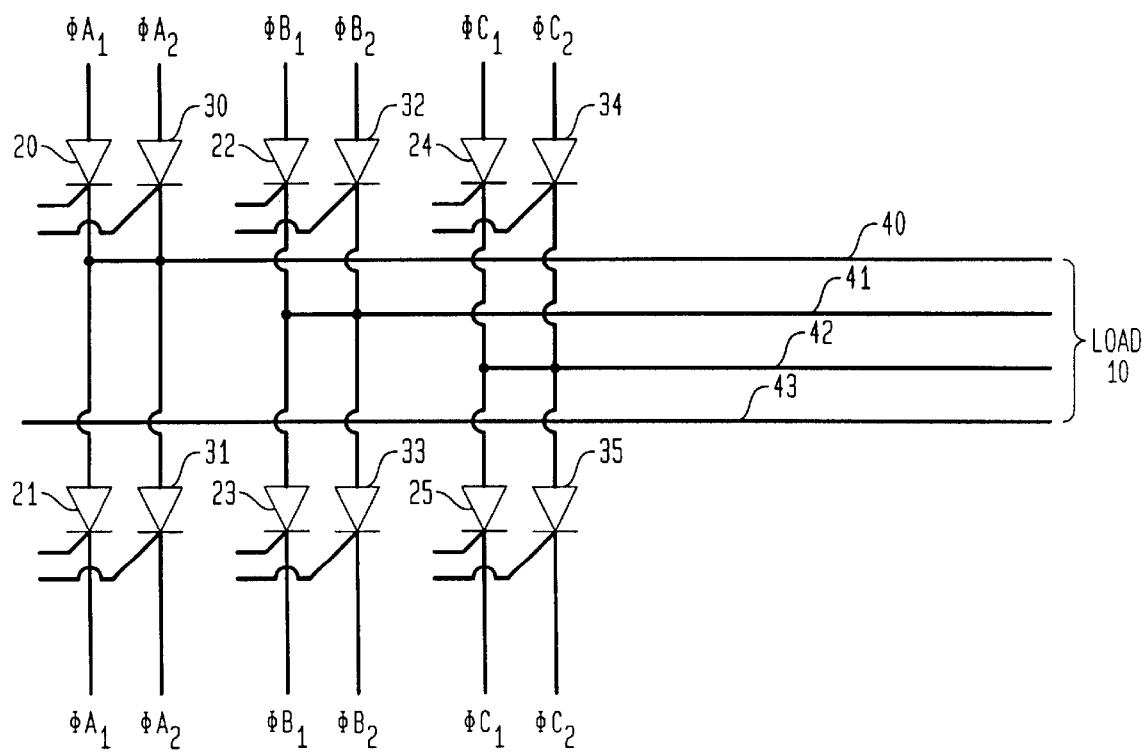
FIG. 2 is a schematic of the power paralleling circuit according to another embodiment of the present invention.

FIG. 2 depicts the topology of power bridges 6 and 8 of FIG. 1 in greater detail. Specifically, FIG. 2 shows two three-phase voltage or power sources ($\phi_{A1}$, $\phi_{B1}$, $\phi_{C1}$ and $\phi_{A2}$, $\phi_{B2}$, $\phi_{C2}$) connected in parallel by way of a plurality of silicon controlled rectifiers (SCRs). A fist-phase parallel connection of the first voltage source includes a first SCR 20 having its anode connected to the $\phi_{A1}$ line and the cathode connected to a first parallel output line 40. The first-phase parallel connection of the first voltage source also includes a second SCR 21 having its cathode connected to the $\phi_{A1}$ line and its anode connected to the first parallel output line 40. A second-phase parallel connection for the first voltage source includes a third SCR 22 having its anode connected to the $\phi_{B1}$ line and the cathode connected to a second parallel output line 41. The second-phase parallel connection for the first voltage source also includes a fourth SCR 23 having its cathode connected to the $\phi_{B1}$ and the anode connected to the second parallel output line 41. A third-phase parallel connection for the first voltage source includes a fifth SCR 24 having its anode connected to the $\phi_{C1}$ line and the cathode connected to a third parallel output line 42. The third-phase parallel connection for the first voltage source also includes a sixth SCR 25 having its cathode connected to the $\phi_{C1}$ line and the anode connected to the third parallel output line 42.

A first-phase parallel connection for the second voltage source includes a first SCR 30 having its anode connected to the $\phi_{A2}$ line and the cathode connected to the first parallel output line 40. The first-phase parallel connection for the second voltage source also includes a second SCR 31 having its cathode connected to the $\phi_{A2}$ line ad the anode connected to the first parallel output fine 40. A second-phase parallel connection for the second voltage source includes a third SCR 32 having its anode connected to the $\phi_{B2}$ line and the cathode connected to the second parallel output line 41. The second-phase parallel connection for the second voltage source also includes a fourth SCR 33 having its cathode connected to the $\phi_{B2}$ fine and the anode connected to the second parallel output fine 41. A third-phase parallel connection for the second voltage source includes a fifth SCR 34 having its anode connected to the $\phi_{C2}$ line and the cathode connected to a third parallel output line 42. The third-phase parallel connection for the second voltage source also includes a sixth SCR 35 having its cathode connected to the $\phi_{C2}$ line and the anode connected to the third parallel output line 42. Parallel output lines 40, 41, and 42, and a common neutral line 43 are supplied to common load 10.

Having the parallel connection as described with reference to FIG. 2, load 10 is supplied with continuous power with reduced points of failure between the utilities and equipment rack. As earlier indicated, communication and host server equipment require seamless, uninterrupted power supply in the event of a failure. Through the configuration as shown in FIG. 2, load 10 draws power from each of the power sources in a shared manner, although certain tolerable imbalances may occur due to differences in mean voltage levels of the respective AC sources. To compensate for such variation, an impedance may be inserted in series with corresponding pairs of silicon controlled rectifiers to obtain a balance or equal supply of source power to the load. Diode conduction properties of the SCRs prevent power of the first source from flowing back towards the second source, and vice versa. By using the two AC power sources and the two gate firing circuits, the SCR bridges are in what is called a "2N configuration." The gating trigger signals for the above SCRs will be explained hereafter with reference to FIGS. 4A and 4B.

Figure 3:
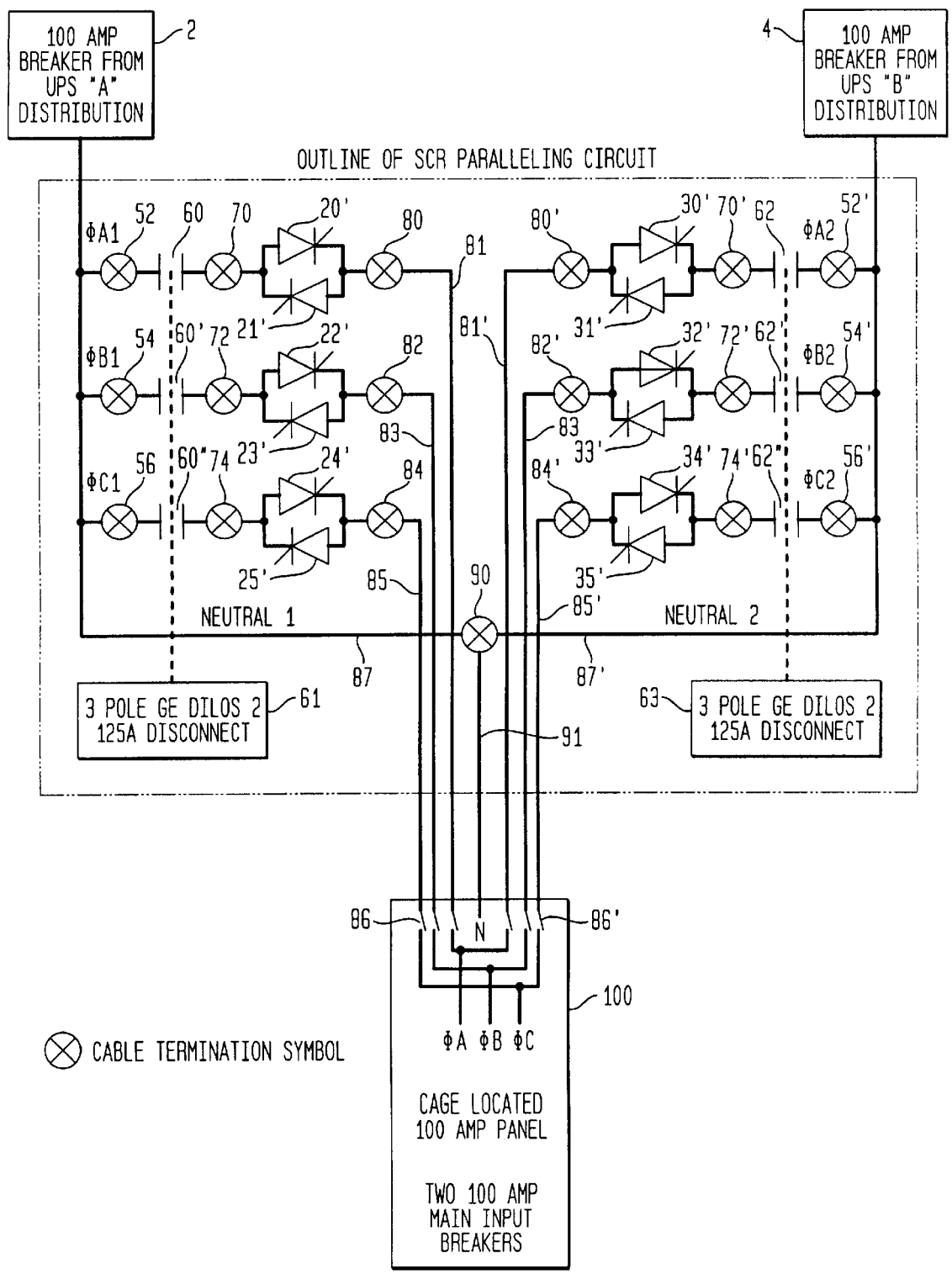
FIG. 3 is a schematic of the power paralleling circuit according to FIG. 2.

FIG. 3 shows an electrical schematic diagram of a power paralleling circuit according to a second embodiment of the present invention. The illustrated parallel power connection includes two three-phase UPS voltage sources 2 ($\phi_{A1}$, $\phi_{B1}$, $\phi_{C1}$) and 4 ($\phi_{A2}$, $\phi_{B2}$, $\phi_{C2}$) connected in parallel by way of a plurality of silicon controlled rectifiers (SCRs), a plurality of manual disconnect switches, and a pair of three-phase three-pole electrically operated breakers. The term plurality is also referred to as group. A first phase parallel connection of a first voltage UPS source 2 includes a series connection of a first cable termination 52, a first phase pole manual disconnect switch contact 60, a second cable termination 70, a first pair of reverse-connected parallel SCRs 20' and 21', and a third cable termination 80. A second phase parallel connection of the first voltage UPS source 2 includes a series connection of a fourth manual disconnect switch 54, a second phase pole manual disconnect switch contact 60', a fifth cable termination 72, a second pair of reverse-connected parallel SCRs 22' and 23', and a sixth cable termination 82. A third phase parallel connection of the first voltage UPS source 2 includes a series connection of a seventh cable termination 56, a third phase manual disconnect switch contact 60", an eighth cable termination 74, a third pair of reverse-connected parallel SCRs 24' and 25', and a ninth cable termination 84. A first set of power lines 81, 83, and 85 are connected to the cable terminations 80, 82, and 84, respectively. Power lines 81, 83, and 85 supply a first half of a parallel power source to a 100 amp breaker 86 power panel 100.

Still referring to FIG. 3, a first phase parallel connection of a second voltage UPS source 4 includes a series connection of a first cable termination 52', a first phase manual disconnect switch contact 62, a second cable termination 70', a first pair of reverse-connected parallel SCRs 30' and 31', and a third cable termination 80'. A second phase parallel connection of the second voltage UPS source 4 includes a series connection of a fourth cable termination 54', a second phase manual disconnect switch contact 62', a fifth cable termination 72', a second pair of reverse-connected parallel SCRs 32' and 33', and a sixth cable termination 82'. A third phase parallel connection for the second voltage UPS source 4 includes a series connection of a seventh 56', a third phase pole manual disconnect switch contact 62", an eighth cable termination 74', a third pair of reverse-connected parallel SCRs 34' and 35', and a ninth cable termination 84'. A second set of power lines 81', 83', and 85' are connected to the cable terminations 80', 82', and 84', respectively. Power lines 81', 83', and 85' supply the second half of a parallel power source to the power cage 100. A cable termination 90 electrically connects the neutral lines from both UPS sources (2, 4) to a neutral line 91 for the power panel 100.

Still referring to FIG. 3, manual disconnect switch contacts (60, 60', 60") and (62, 62', 62") are manually opened or closed by disconnect handles 61 and 63, respectively. Having the parallel connection as described with reference to FIG. 3, power is delivered to panel 100 from two sources. Uninterrupted power to panel 100 will continue with a failure of one of the power sources. Disconnect switches 61, 63 and breakers 86, 86' isolate source power from the SCRs and power panel for maintenance repairs.

Operation of the SCRs as shown in FIGS. 2 and 3 will now be explained with reference to FIGS. 4A, 4B, and 5.

Figure 5:
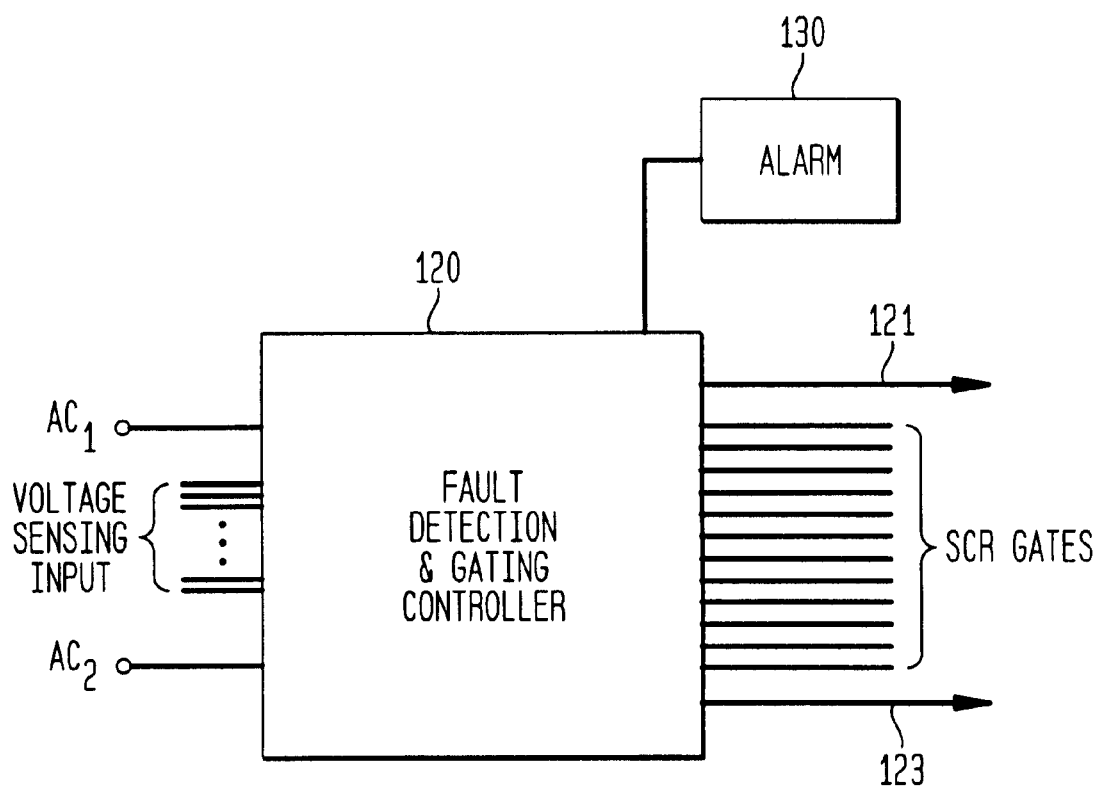
FIG. 5 illustrates a control and alarm diagram for use in accordance with a preferred embodiment of the present invention.

Fault detection and gating controller 120 of FIG. 5, hereafter "the controller", supplies gate trigger signals to the SCRS. As shown in FIGS. 4A and 4B, periodic trigger signals occur at or near zero crossing points of the three-phase AC power signals. With reference to the first-phase $\phi_{A1}$ (FIG. 2 and 3) of the first voltage source, SCR (20, 20') is triggered at or near the zero crossing point for the positive going wave cycle and SCR (21, 21') is triggered at or near the zero crossing point for the negative going wave cycle. Triggering of the other SCRs is done in a similar manner. Accordingly, SCR (22, 22') is triggered at or near the zero crossing point for the $\phi_{B1}$ positive going wave cycle and SCR (23, 23') is triggered at or near the zero crossing point for the $\phi_{B1}$ negative going wave cycle. With reference to the third-phase, SCR (24 24') is triggered at or near the zero crossing point for the $\phi_{C1}$ positive going wave cycle and SCR (25, 25') is triggered at or near the zero crossing point for the $\phi_{C1}$ negative going wave cycle. By the time the first-phase $\phi_{A1}$ completes a full cycle in 0.01666 sec., all of the triggering pulses have been issued except for SCR (25, 25'). In the preferred embodiment, the width of each triggering pulse is approximately 0.4 ms or less. The triggering pulses for the SCRs in line with the second voltage source operate in the similar manner. Accordingly, the triggering pulses for SCRs 30, 30, 31, 31, 32, 32', 33, 33', 34, 34, 35, and 35 can be similarly described.

Returning to FIG. 5, controller 120 senses the voltage sources $AC_1$ and $AC_2$ waveforms and accordingly supplies the triggering pulses as shown in FIGS. 4A and 4B. In sensing the $AC_1$ and $AC_2$ waveforms, the controller also checks for any faults that ray occur in the sources. If a fault is detected, the controller 120 controls the triggering pulses to effectively remove a source from the parallel circuit by shuting down the SCRs for that source. For example, if controller 120 senses that $AC_2$ has a fault, the controller 120 discontinues the triggering pulses to SCRs 30, 30, 31, 31, 32, 32', 33, 33', 34, 34', 35, and 35'. In addition, when a fault is detected, an alarm 130 can be triggered to alert personnel that a fault has occurred. When it is determined that $AC_2$ has returned to normal, the controller then resumes the triggering pulses for the SCRs in the $AC_2$ parallel circuit. Controller 120 may also respond to a fault by opening an in-line switch (solid state or breaker) between a phase or source, on one hand, and the load device, on the other hand.

Controller 120 further senses the voltage levels across the various SCRs via sensing lines, as indicated FIG. 5. Again, if the controller determines that an SCR is malfunctioning or does not perform according to specification, then the controller 120 issues trip signals via lines 121 or 123. For example, if it is determined that SCR 34' in the phase line $\phi_{C2}$ for the source $AC_2$ is faulty, e.g., out of sync or higher or lower than a prescribed voltage, then the controller 120 will issue a trip signal, via line 123, to the breaker 86'. The tripping of breaker 86' directs source power into or out of panel 100. Once again, the controller 120 activates the alarm 130. Once the breaker 86' is opened, maintenance personnel may then remove the defective SCR 34' by opening the manual disconnect switches 63. For economic reasons, the SCR pair 34' and 35' may be removed together as a single unit. The parallel circuit of FIG. 3 includes a plurality of manual disconnect switches, as indicated above, to facilitate the isolation of defective components.

Controller 120 may also provide self-diagnostics by monitoring the status of the SCRs themselves in order to issue an alarm or to isolate a defective power phase or a defective SCR where there is redundancy in SCR devices or switches. Similarly, provision for monitoring the sensors themselves may be provided.

Additional advantages and modifications will readily occur to those skilled in the art. The invention in its broader aspects is therefore not limited to the specific details, any representative apparatus, or the illustrative examples shown and described. Accordingly, departures may be made from such details without departing from the spirit or the scope of the general inventive concept. The invention is defined by the following claims.

I claim:

1. A power paralleling circuit that combines at least two independent multiphase AC power sources to supply a common load, said circuit comprising:
    a first group of silicon controlled rectifiers connectable to a first multiphase power source, each phase of said first multiphase power source supplying a corresponding rectifier in said first group;
    a second group of silicon controlled rectifiers connectable to a second multiphase power source, each phase of said second multiphase power source supplying a corresponding rectifier in said second group;
    a monitor that monitors an operating status of said phases of power; and
    a controller that enables SCR gate trigger signals to fire the respective silicon controlled rectifiers at or near zero crossing of the phases of power associated with the respective silicon controlled rectifiers during normal operation and that responds to said monitor to isolate from the common load a faulty phase of said AC power sources.

2. The power paralleling circuit as claimed in claim 1, wherein said monitor monitors at least one of synchronization between corresponding phases of the power sources, an over-voltage condition, and an under-voltage condition.

3. The power paralleling circuit as claimed in claim 1, wherein said first and second groups of silicon controlled rectifiers comprise a pair of silicon controlled rectifiers for each phase of said multiphase sources.

4. The power paralleling circuit as claimed in claim 3, wherein said controller further includes sensor inputs for detecting faults in either of said silicon controlled rectifiers or said power sources.

5. The power paralleling circuit as claimed in claim 4, further comprising a first plurality of disconnect devices for isolating from said load respective phases of said power sources in response to a fault condition.

6. The power paralleling circuit as claimed in claim 5, further comprising an alarm responsive to said controller for signaling that a fault condition has been detected.

7. The power paralleling circuit as claimed in claim 5, wherein a plurality of disconnect devices for removing said power sources are installed in series with each phase of said multiphase source between said source and said silicon controlled rectifiers.

8. A multiphase alternating current power paralleling circuit comprising:
    an input for a first multiphase source;
    a first group of wire terminating devices, wherein one side of each wire terminating device thereof is connectable to at least one phase of said first multiphase source and the other side of said each wire terminating device is connected to a first disconnecting device;
    a second group of wire terminating devices, wherein each wire terminating device is connectable to at least one of said first group of disconnect devices;
    a first plurality of silicon controlled rectifiers, wherein each rectifier thereof is connectable to at least one of said second group of wire terminating devices;

an input for a second multiphase source;

a third group of wire terminating devices, wherein one side of each wire terminating device thereof is connectable to at least one phase of said second multiphase source input and the other side of said each wire terminating device is connected to a second disconnecting device;

a fourth group of wire terminating devices, wherein each wire terminating devices is connected to at least one of said second disconnect devices;

a second plurality of silicon controlled rectifiers, wherein each of said second plurality of silicon controlled rectifiers is connected to at least one of said fourth group of wire terminating devices; and a first group of two electrically operated breakers with outputs couple together to form a paralleling output and wherein breaker inputs are connected to wire terminating devices of said first and second plurality of silicon controlled rectifiers.

9. The power paralleling circuit as claimed in claim 8, wherein at least certain ones of devices in said first group of disconnect devices are manually controlled.

10. The power paralleling circuit as claimed in claim 8, wherein certain ones of devices in said first group of breakers are electrically controlled.

11. The power paralleling circuit as claimed in claim 8, further comprising a fifth group of disconnect devices, wherein each of the devices in said fifth group is connected between at least one of said first plurality of silicon controlled rectifiers and said paralleling output.

12. The power paralleling circuit as claimed in claim 11, further comprising a sixth group of disconnect devices, wherein each device of said sixth group is connected between at least one of said second group of silicon controlled rectifiers and said paralleling output.

13. The power paralleling circuit as claimed in claim 11, wherein said fifth group of disconnect devices are manually controlled.

14. The power paralleling circuit as claimed in claim 12, wherein said sixth group of disconnect devices are manually controlled.

15. A method of supplying uninterruptible power to a common load utilizing a power paralleling circuit having a plurality of silicon controlled rectifiers connected in parallel, said plurality of silicon controlled rectifiers including a first group of silicon controlled rectifiers connected to a first power source and a second group of silicon controlled rectifiers connected to a second power source, said method comprising:

providing gating signals to the first group of silicon controlled rectifiers at or near zero crossings of respective waveforms of said first power source;

providing gating signals to the second group of silicon controlled rectifiers at or near zero crossings of respective waveforms of said second power source;

monitoring status indications of respective phases of said first and second power sources; and in response to said monitoring, controlling the current path in said silicon control rectifiers to isolate a faulty phase.

16. The method as claimed in claim 15, further comprising sensing a fault condition in at least one of said first power source and said second power source.

17. The method as claimed in claim 15, further comprising removing one of said first and second power sources upon detection of a fault in one of said sources.

18. The method as claimed in claim 15, further comprising removing selected ones of said silicon controlled rectifiers from either group if a fault is detected.

19. The method as claimed in claim 18, wherein the step of removing at least one of said first and second power sources further comprises the step of manually disconnecting the power sources.

20. The method as claimed in claim 19, wherein the step of removing at least one of said first and second power sources further comprises the step of providing an electrically operated breaker to disconnect the power sources.

21. The method as claimed in claim 20, further including removing selected ones of said silicon controlled rectifiers from either group by manually disconnecting said selected ones of said silicon controlled rectifiers in response to a fault condition.

22. The method as claimed in claim 15, further comprising the step of providing an alarm indication that a fault has occurred.

23. The method as recited in claim 15, further comprising providing an impedance in series with corresponding pairs of silicon controlled rectifiers of said first and second power sources to obtain source power balance.

* * * * *